ABSTRACT OF THE DISCLOSURE

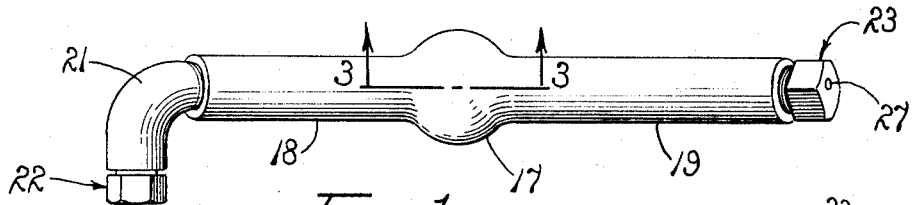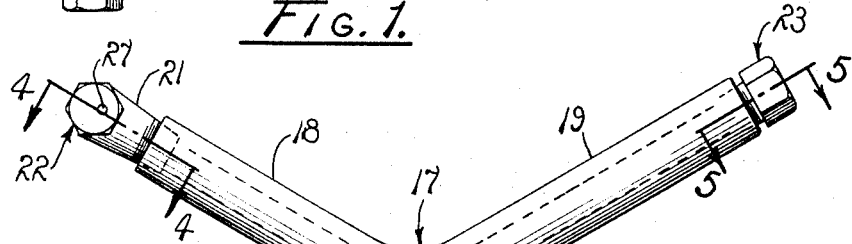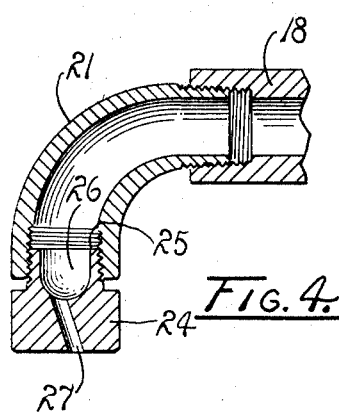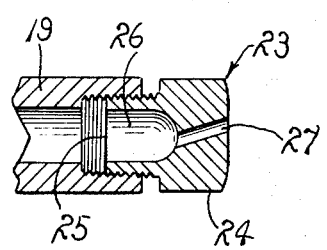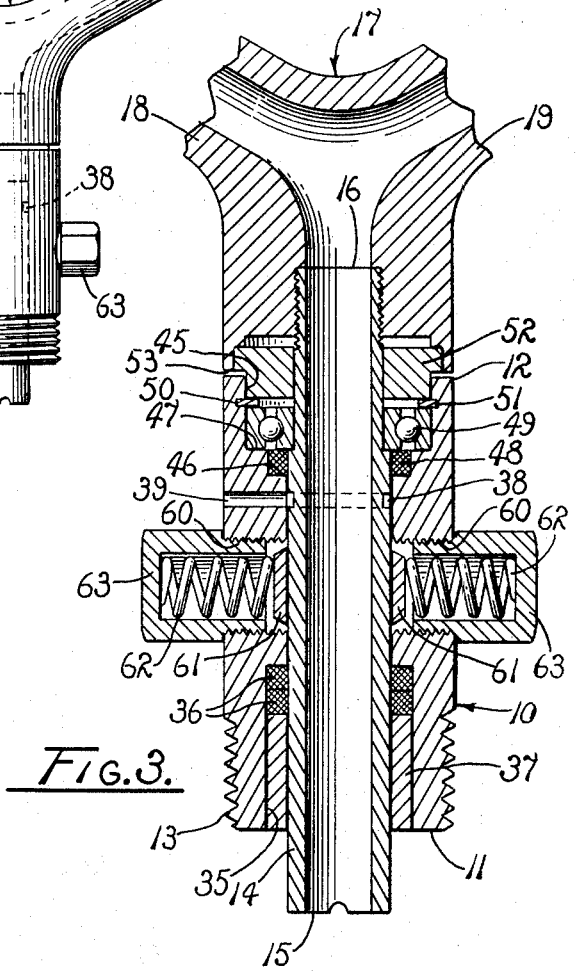
MARCEL J. KENNEDY
WILLIAM M. ROYER
INVENTORS 3,386,662
ROTARY SPRINKLER
Marcel J. Kennedy and William M. Royer, Fresno, Calif., assignors to Floway Pumps, Inc., a corporation of California
Filed Jan. 24, 1966, Ser. No. 522,750
10 Claims. (Cl. 239—259)

The invention consists essentially of a coupling in which a spindle is mounted for rotation on a rolling contact bearing, a pair of spaced apart water seals circumscribing the spindle and ported to the atmosphere therebetween, a sprinkler head secured to the spindle and having a discharge tube eccentric thereto, and a nozzle in the tube having a hemispherical chamber and an outlet orifice extending obliquely from the chamber and offset from the axis thereof.

---

The present invention relates to a rotary sprinkler and more particularly to a rotary sprinkler having improved rotational mounting, fluid projection and speed control.

Rotary sprinklers have long been used in agricultural and garden or landscape irrigation. Although successful in large measure for their intended purposes, their extensive use has resulted in widespread recognition of certain difficulties which have been the object of careful attention for many years.

For example, the effective sealing of relatively rotating parts against leakage has resulted in frictional drag which impedes or precludes proper rotation. To overcome such drag, either an excessive turning force has been designed into such sprinklers or successive jarring impacts have been provided to assure movement in increments of stepped progression coincident with such impacts. The former reduces trajectory and area of distribution, frequently results in erratic turning speeds, and is conducive to rapid wear. The latter has inherent water distribution problems making uniformity of coverage difficult to achieve; the impacts are generated by a flapping device which reciprocates to and from the main water stream causing too much dispersion of the water into a mist which does not properly project, tends to drift in random air-borne dispersal and causes excessive loss by evaporation; the impacts are prone to cause excessive wear; and the noise of the impacts is objectional in certain operational environments.

It has been proposed to minimize these difficulties by mounting such sprinklers for rotation on rolling contact bearings, such as roller bearings or ball bearings, but such efforts prior to the present invention have not been successful. Rolling contact bearings are prone to rust unless protected from moisture and it has previously been impossible adequately to shield them from the water. It has also been difficult adequately to minimize leakage in sprinklers utilizing rolling contact bearings.

An object of the present invention is to provide an improved rotary sprinkler.

Another object is to minimize frictional resistance to rotation in rotary sprinklers.

Another object is to make possible the utilization of rolling contact bearings in rotary sprinklers.

Other objects are to provide a rotary sprinkler having improved discharge trajectory, distribution characteristics, and adjustability.

Another object is to provide an improved nozzle for rotary sprinklers.

Further objects are to provide improved elements and arrangements thereof in a sprinkler of the character described.

Still further objects and advantages will become apparent in the subsequent description in the specification.

In the drawings:

FIG. 1 is a plan view of a rotary sprinkler embodying the principles of the present invention.

FIG. 2 is a side elevation of the rotary sprinkler of FIG. 1.

FIG. 3 is a somewhat enlarged fragmentary vertical section taken on line 3—3 of FIG. 1.

FIG. 4 is a somewhat enlarged section taken on line 4—4 of FIG. 2.

FIG. 5 is a somewhat enlarged section taken on line 5—5 of FIG. 2.

Referring in greater detail to the drawings, the illustrative embodiment of the present invention employs a tubular coupling 10 having a mounting or inlet end 11 and outlet end 12. External threads 13 are provided on the inlet end for attachment to any suitable source of water or other fluid under pressure.

A tubular spindle 14 having an inlet end 15 and outlet end 16 is rotatably mounted within the coupling. A V-shaped tubular sprinkler head 17 is screw-threadably mounted on the outlet end of the spindle. The sprinkler head includes elongated outlet tubes 18 and 19 divergently upwardly extended.

As shown in FIG. 1, an adjustably positionable street elbow 21 is screw-threadably mounted on the outlet tube 18 and a first nozzle 22 is screw-threadably mounted therein. A similar second nozzle 23 is screw-threadably mounted directly in the end of outlet tube 19.

Each of the nozzles 22 and 23 includes a body 24 having an inlet 25 providing a longitudinal axis and terminating in a chamber 26. The chamber is symmetrically disposed about the longitudinal axis and is defined by a surface of revolution concentric to the axis of progressively reduced radii inwardly of the nozzle. The chamber is preferably hemispherical, as shown. An elongated orifice 27 extends from the chamber. It is significant that the orifice is oblique to the axis and offset therefrom for reasons subsequently described.

The inlet end 11 of the coupling 10 has a counterbore 35 and a double packing 36 is provided therein between the coupling and spindle 14 to minimize water leaking up the exterior of the spindle. A retainer ring 37 is press fitted or otherwise secured in the counter-bore to compress and maintain the packing in a fixed position. A circumscribing groove 38 is provided on the periphery of the spindle in upwardly spaced relation to the packing and a port 39 drilled in the coupling communicates with the groove and ports to atmosphere any water which may leak past the packing.

The coupling 10 at its outlet end is counter-bored to provide a cylindrical side wall 45, a first shoulder 46 and a second shoulder 47. An annular packing seal 48 is carried on the first shoulder 46 and a rolling contact bearing 49 is mounted immediately above the packing seal on the second shoulder 47 which has an outer race fitted to the wall 45 and an inner race fitted about the spindle 14, the upper portion of which is of reduced diameter for the purpose. The bearing may be either of the roller or ball type. A snap ring 50 is mounted in a peripheral groove 51 in the side wall 45 in contact with bearing 49 to hold it in place. A seal cover 52 is press fitted or otherwise mounted in the upper end of the counter-bore between the sprinkler head 17 and the snap ring. The snap ring 50 holds the bearing 49 tightly against the packing seal 48 to preclude leakage by capillary attraction or otherwise upwardly to the bearing. The seal cover 52 is of a smaller diameter than the sprinkler head 17 and the head provides a downwardly extended annular skirt 53 which outwardly overlaps the cover and shields it from splashed water and the like.

For speed regulation, a pair of diametrically related, screw-threaded bores 60 are provided in the coupling 10. A friction pad 61 is located in each bore against the spindle 14. Compression springs 62 are positioned against the pads and housed under compression in caps 63 screw-threadably mounted in the bores. The pressure of the pads against the spindle and thus the frictional resistance to rotation of the spindle exerted by the pads is regulated by screwing the caps inwardly and outwardly of the bores.

*Operation*

The operation of the described embodiment of the subject invention is believed to be clearly apparent and is briefly summarized at this point. When water or other liquid is forced into the inlet end 15 of the tubular spindle 14, it passes through outlet tubes 18 and 19 and is projected from the respective nozzles 22 and 23. The extent of angular relation between the orifices 27 and true radial relation to the rotational axis of the spindle 14 as well as the radial spacing of said orifices from said axis determine their effective turning moment exerted on the head 17 and the spindle. Since the elbow 21 can be rotationally positioned in the tube 18 and the nozzle 22 rotationally positioned in the elbow a wide range of adjustment to regulate turning moment, discharge trajectory, rotational speed, water dispersal and water distribution is possible. Similarly, although to a lesser degree, rotational positioning of the nozzle 23 in the tube 19 permits adjustment to meet environmental and performance requirements. Further the nozzles can be positioned to have opposing or augmenting turning moments. Preferably they are arranged to provide substantially balancing thrusts to minimize tendencies to wobble or nutate. With nozzles 22 and 23 adjusted as desired, the caps 63 are also adjusted to modulate the turning speed achieved by the available water pressure and volume of discharge. The simplified packing system employed and the utilization of the rolling contact bearing 49 achieves free turning action of the head 17 and the spindle 14. This permits nozzle adjustment primarily to attain desired water distribution and area of coverage with a minimum of concern over turning moment or driving force since so little force is required. Under most operating conditions, the turning forces which are incident to adjustment of the nozzles for best distribution purposes, although in many instances insufficient to drive conventional rotary sprinklers, results in excess rotational speed which is preferably restricted by the adjustable frictional resistance offered by the pads 61. This allows a wide range of regulation and control not available in previous rotary sprinklers.

Generally it has previously been found that when rolling contact bearings are employed in rotary sprinklers, they rust quickly and are subject to rapid wear by abrasive particles. The present sprinkler is substantially free from these conditions since water is effectively excluded from the bearing 49. The packing 36 effectively blocks or minimizes water passage up the exterior of the spindle 14 internally of the coupling 10. Any water leaking past the double packing collects in the groove 38 and discharges from the coupling through the port 39. In an abundance of precaution, the packing seal 48 is provided between the port and the bearing. The port permits atmospheric pressure equalization on opposite sides of the packing seal so that no pressure differential can occur to force water past the seal. The bearing is effectively shielded from splashed or downwardly dripping water by the seal cover 52 and outwardly overlaying skirt 53.

A further feature of the invention is the unique nozzles 22 and 23. Although the precise pattern of water flow is not entirely understood, the provision of the chamber symmetrically disposed about a longitudinal axis, defined by a surface of revolution concentric to the axis of progressively reduced radii and with the orifice oblique to the axis and offset therefrom achieves a markedly superior discharge stream for such sprinklers. The water is discharged in a stream conducive control and optimum trajectory. However, after departing from the orifice and projecting for some distance, dependent in extent upon orifice size, orifice length and water pressure, the stream breaks up into droplets of rain-like magnitude with a minimum of mist. Such droplets have a lower evaporative loss, carry better in their trajectory, are more easily controlled, and more efficiently deliver water to the ground than the smaller droplets and mist characteristic of previous sprinklers. It is believed that the result is attained by the water swirling in the chamber, being drawn off obliquely to the axis tangentially of the swirling action, and discharged in a twisting stream of sufficient angular velocity to break up during trajectory. It is noted that it is helpful to use an orifice of appreciable length, as for example from one-eighth (⅛) to one-fourth (¼) of an inch. Lengthening the orifice tends to enlarge the ultimate droplet size.

The sprinkler of the present invention is more easily rotated, has a wider range of control, wastes less water by evaporation and drift, has less leakage, and possesses greater durability than previous rotary sprinklers.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A sprinkler comprising a tubular coupling having an inlet end and an outlet end, a tubular spindle having an inlet end an an outlet end mounted within the coupling, a rolling contact bearing mounted in the coupling in circumscribing relation to the spindle and in spaced relation to the inlet end of the coupling, a sprinkler head mounted on the outlet end of the coupling, and a pair of seals circumscribing the spindle within the coupling and spaced longitudinally of the spindle between the bearing and the inlet end of the spindle providing spaced fluid barriers between the spindle and the coupling, the coupling being ported to the atmosphere between said fluid barriers.

2. The sprinkler of claim 1 in which the sprinkler head has a discharge tube eccentric to the spindle, and including a nozzle mounted in the tube providing a longitudinal axis and terminating in a chamber defined by a surface of revolution concentric to said axis, and an elongated outlet orifice extended from the chamber at an angle to said axis.

3. The sprinkler of claim 2 in which the surface of revolution is of progressively reduced radii and the orifice is angularly related to all of such radii.

4. In a rotary sprinkler, the combination of a coupling having a bore longitudinally therethrough and providing an inlet end and an outlet end, a tubular spindle, a rolling contact bearing mounted in the bore of the coupling and rotatably supporting the spindle therein, a pair of annular packings in circumscribing relation to the spindle within the coupling between the bearing and the inlet of the coupling at positions spaced axially of the spindle, and means maintaining the packings under sealing compression, the coupling having a port communicating to the atmosphere between said packings.

5. The combination of claim 4 having friction means mounted in the coupling in engagement with the spindle at a position between the port and the inlet end of the coupling.

6. A sprinkler comprising a tubular coupling having a mounting end and an opposite end, a tubular spindle having an inlet end and an outlet end, a bearing mounted within the coupling in spaced relation to the mounting end thereof, said bearing circumscribing said spindle and mounting the same for rotation in the coupling, and a seal within the coupling disposed in circumscribing relation to the spindle and spaced from said bearing, said coupling being ported between the seal and the bearing for releasing any fluid leaking through the seal and diverting it from reaching the bearing.

7. The sprinkler of claim 6 in which the bearing is a rolling contact bearing.

8. The sprinkler of claim 6 in which a seal cover is mounted on said opposite end of the coupling in circumscribing relation to the spindle between the bearing and the outlet end of the spindle.

9. The sprinkler of claim 6 in which an additional seal is located between the bearing and the first-named seal in circumscribing relation to the spindle, and the coupling is ported between the seals.

10. The sprinkler of claim 9 in which a further seal is provided in the coupling in circumscribing relation to the spindle between the bearing and the outlet end of the spindle.

References Cited

UNITED STATES PATENTS

| 1,976,030 | 10/1934 | Lighthall | 239—251 |
| 2,539,793 | 1/1951 | Pangborn | 239—258 |
| 2,596,191 | 5/1952 | Windhom | 239—264 |

FOREIGN PATENTS

| 181,182 | 9/1922 | Great Britain. |

EVERETT W. KIRBY, *Primary Examiner.*